No. 619,784. Patented Feb. 21, 1899.
E. L. PERRY.
STEAM PACKING GASKET.
(Application filed May 19, 1898.)
(No Model.)
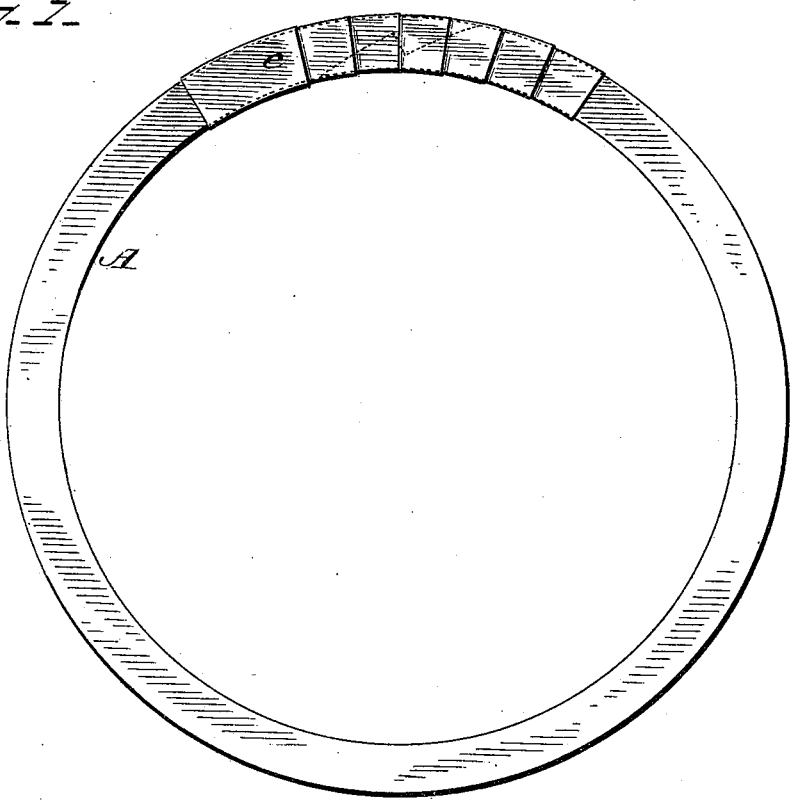
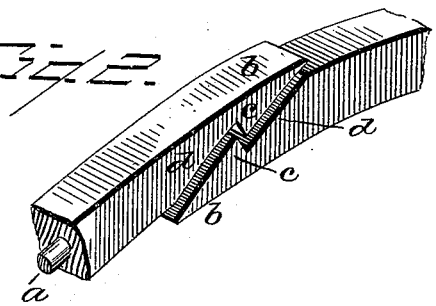
Witnesses
C. J. Williamson
W. P. Acker
Inventor
Edward L. Perry,
per Chas. H. Fowler.
Attorney.
THE NORRIS PETERS CO., PHOTO-LITHO., WASHINGTON, D. C.

UNITED STATES PATENT OFFICE.

EDWARD L. PERRY, OF PATERSON, NEW JERSEY.

STEAM-PACKING GASKET.

SPECIFICATION forming part of Letters Patent No. 619,784, dated February 21, 1899.

Application filed May 19, 1898. Serial No. 681,143. (No model.)

*To all whom it may concern:*

Be it known that I, EDWARD L. PERRY, a citizen of the United States, residing at Paterson, in the county of Passaic and State of New Jersey, have invented certain new and useful Improvements in Steam-Packing Gaskets; and I do hereby declare that the following is a full, clear, and exact description of the same, reference being had to the annexed drawings, making a part of this specification, and to the letters of reference marked thereon.

The present invention has relation to the construction of the joints or meeting ends of a steam-packing gasket, whereby when the joining ends of the gasket are placed in a hot-steam joint and vulcanized the two ends will be homogeneous and of sufficient strength to resist any lateral pressure when the manhole-plate is brought in contact with it.

The invention consists in a joint for the ends of steam-packing gaskets constructed substantially as shown in the drawings and hereinafter described and claimed.

Figure 1 of the drawings is a side elevation of a steam-packing gasket, showing the joining ends in dotted lines and the joint wrapped with a strip of fibrous material; Fig. 2, a detail view in perspective showing the two joining ends of the gasket separated and the binding-strip removed.

In the accompanying drawings, A represents the gasket-ring, of rubber or other suitable elastic material, square or flat-sided in cross-section and provided with a lead core $a$ to remove the elasticity of the gasket at its center, and thus enable the gasket to take the desired form necessary. The meeting ends of the gasket terminate in wedge-shaped extremities $b$ and at their base or inner portions have shoulders $c$, and back of these shoulders are inclined seats $d$ for the wedges to seat themselves, thereby forming a perfect locking-joint that will be flush upon both sides of the gasket, making it uniform in thickness throughout its length to enable it to conform to any groove in which it may be placed. The adjoining ends of the gasket are held together while being vulcanized by a strip of fibrous material, as shown at $e$, suitably wrapped around it.

It is necessary to have a locking-joint between the ends of the gasket, so that when the gasket is in position in a hot-steam joint the two ends which lock each other will become hermetically sealed and one homogeneous mass by the action of the heat which vulcanizes the overlapping ends of the joint. Thus when the manhole-plate is brought in contact with the gasket and screwed into place the ends will not be forced apart and cause a leak by any outward or lateral pressure thereon, and in this particular the locking-joint is of material importance when applied to the ends of a gasket where the joint becomes vulcanized.

Having now fully described my invention, what I claim as new, and desire to secure by Letters Patent, is—

A steam-packing gasket of rubber or other like elastic material and square or flat-sided in cross-section, a central metal core extending through the gasket and the meeting ends of the gasket having wedge-shaped extremities and locking-shoulders, and a strip of fibrous material wrapped around the joining ends to hold them together while being vulcanized, as and for the purpose set forth.

In testimony that I claim the above I have hereunto subscribed my name in the presence of two witnesses.

EDWARD L. PERRY.

Witnesses:
W. B. ACKER,
GEO. M. COPENHAVER.